US011908295B2

(12) United States Patent
Tonelli et al.

(10) Patent No.: US 11,908,295 B2
(45) Date of Patent: Feb. 20, 2024

(54) ANTI-INTRUSION SECURITY SENSOR AND SECURITY SYSTEM INCLUDING SAID SENSOR

(71) Applicant: DEA SECURITY S.R.L., Santo Stefano di Magra (IT)

(72) Inventors: Aldo Tonelli, Santo Stefano di Magra (IT); Giorgio Tonelli, Santo Stefano di Magra (IT); Diego Maglianesi, Santo Stefano di Magra (IT); Sergio Leonardi, Santo Stefano di Magra (IT)

(73) Assignee: DEA SECURITY S.R.L., Santo Stefano di Magra (IT)

( * ) Notice: Subject to any disclaimer, the term of this patent is extended or adjusted under 35 U.S.C. 154(b) by 84 days.

(21) Appl. No.: 17/795,484

(22) PCT Filed: Jan. 13, 2021

(86) PCT No.: PCT/IB2021/050208

§ 371 (c)(1),
(2) Date: Jul. 26, 2022

(87) PCT Pub. No.: WO2021/152409

PCT Pub. Date: Aug. 5, 2021

(65) Prior Publication Data

US 2023/0095766 A1 Mar. 30, 2023

(30) Foreign Application Priority Data

Jan. 27, 2020 (IT) ........................ 102020000001495

(51) Int. Cl.
*G08B 13/22* (2006.01)
*G08B 29/18* (2006.01)

(52) U.S. Cl.
CPC ........... *G08B 13/22* (2013.01); *G08B 29/188* (2013.01)

(58) Field of Classification Search
CPC .... G08B 13/22; G08B 29/188; G08B 13/122; G08B 13/02; G08B 13/12; G08B 29/18; G08B 21/182
See application file for complete search history.

(56) References Cited

U.S. PATENT DOCUMENTS 4,857,912 A * 8/1989 Everett, Jr. ............ G08B 19/00 340/508
9,000,918 B1 * 4/2015 McLaughlin .......... G08B 13/12 340/541

(Continued)

FOREIGN PATENT DOCUMENTS

IT 1191444 B 3/1988
IT RM20120207 A1 11/2013
WO 2013098861 A1 7/2013

OTHER PUBLICATIONS

International Search Report and Written Opinion for International Patent Application No. PCT/IB2021/050208, dated May 10, 2021, 12 pages.

*Primary Examiner* — Adnan Aziz
(74) *Attorney, Agent, or Firm* — Armstrong Teasdale LLP

(57) ABSTRACT

A security sensor is provided which has a container body and a signal acquisition and processing module housed in the container body. The signal acquisition and processing module has a piezoelectric transducer configured to convert a mechanical stress to which the piezoelectric transducer is subjected into a first electrical signal, an accelerometric transducer configured to convert an acceleration to which the accelerometric transducer is subjected into a second electrical signal, and processing unit operatively connected to the piezoelectric transducer and to the accelerometric transducer for receiving the first and second electrical signals. The accelerometric transducer is a MEMS accelerometric transducer.

13 Claims, 2 Drawing Sheets

(56) References Cited

U.S. PATENT DOCUMENTS

| | | | | |
|---|---|---|---|---|
| 10,062,255 | B1 * | 8/2018 | Russell | G01S 13/867 |
| 2011/0172954 | A1 * | 7/2011 | Berger | G08B 13/122<br>702/150 |
| 2013/0304415 | A1 | 11/2013 | Bomparet | |
| 2013/0335219 | A1 * | 12/2013 | Malkowski | G08B 13/2491<br>340/539.22 |
| 2017/0039825 | A1 * | 2/2017 | Lee | G08B 13/122 |
| 2017/0193765 | A1 | 7/2017 | Weese | |
| 2020/0098232 | A1 * | 3/2020 | Stefanelli | G08B 13/122 |
| 2020/0152025 | A1 * | 5/2020 | Jeon | G08B 13/19656 |

* cited by examiner

ANTI-INTRUSION SECURITY SENSOR AND SECURITY SYSTEM INCLUDING SAID SENSOR

CROSS-REFERENCE TO RELATED APPLICATIONS

This application is a National Stage Application of International Patent Application No. PCT/IB2021/050208, having an International Filing Date of Jan. 13, 2021, which claims priority to Italian Application No. 102020000001495, filed Jan. 27, 2020, the entire contents of each of which are hereby incorporated by reference herein.

FIELD OF THE INVENTION

The present description refers to the technical field of security sensors and relates, in particular, to a security sensor and an anti-intrusion security system comprising said security sensor.

BACKGROUND OF THE INVENTION

Security sensors have been known and widely used for a long time, for example, for controlling intrusions in perimeters of buildings or areas or for surveilling structures to be protected. Such security sensors are generally connected to a control unit external to the sensors, designed to receive and process the signals provided by the security sensors, for example, so as to generate alarms and/or transmit the alarms to a remote monitoring station.

For example, the aforesaid security sensors are used in the control of perimeter fences which delimit critical infrastructures, such as ports, airports, power plants, refineries, military sites, but also prestigious residences, thus operating in all those areas that are highly exposed to the risk of unauthorized perimeter intrusions.

An anti-intrusion security system of the prior art, which may be associated with a net of a perimeter fence, is described in Italian patent No. 1191444. In such patent, in particular, an anti-intrusion security system comprising so-called "piezodynamic" security sensors is described, which, by virtue of a piezoelectric disc and a mobile inertial mass, adapted to cooperate with the piezoelectric disc to stress it, are adapted to detect the vibrations or oscillations of a fence, for example of a fencing net, to supply, as output, electrical signals bearing information related to such vibrations or oscillations. In practice, the fence acts as a support structure for the security sensors. These known security sensors have the advantage of offering significant immunity to environmental disturbances, such as, for example, wind. However, with respect to other security sensors of the prior art, piezodynamic sensors have a relatively large size and are subject to positioning constraints, since they must be installed vertically.

Security sensors are also known which use accelerometric transducers, in particular, MEMS accelerometers. A barrier monitoring system based on MEMS accelerometric transducers is described, for example, in patent application WO2013/098861 A1.

An MEMS accelerometric transducer reacts with high sensitivity to displacements, therefore, when applied on a fencing net, it perceives very well the oscillations which the net undergoes during an intrusion attempt, especially if the intrusion occurs by climbing when the weight and the sudden movements of the intruder cause a strong and anomalous oscillation of the fencing net. Unfortunately, even a strong wind (a very common natural phenomenon), when hitting the fence, causes the net to oscillate, and also in this case the MEMS accelerometric transducer produces signals, which increase together with the increase of the force of the wind hitting the fence.

The main discriminating element, to avoid false signals, between intrusion and wind, is the difference of the two signals, although, especially in the case of poorly stretched fences, the two signals are often equivalent in terms of both oscillation frequency and intensity.

For this reason, wind remains one of the main causes of false alarms in sensors having MEMS accelerometric transducers when applied on fences.

To overcome this drawback, special algorithms for the automatic reduction of the sensitivity in sustained wind conditions have been implemented in anti-intrusion systems having security sensors with MEMS accelerometric transducers.

This is a certainly effective method to reduce false alarms due to wind, but exposes the entire anti-intrusion security system to the risk of not detecting all those intrusions which generate weaker signals with respect to those generated by wind, such as, for example, those made by cutting the metal mesh of the net. In fact, this attack technique, which, by the way, is the most insidious and most used, does not produce significant movements of the fence, but only weak vibrations.

The cutting of the net of a fence, therefore, generates very weak signals in security sensors with MEMS accelerometric transducers, just above the background noise and abundantly below the so-called common mode disturbance caused by wind; for this reason, these attacks are very often not detected, or they are confused with the numerous false alarms due to wind.

Furthermore, security sensors with MEMS accelerometric transducers are not very effective in detecting in advance attempts to break in barriers in closed environments, such as, for example, the cutting of a door accessing a closed environment, since these break-in attempts generate insignificant accelerations of the MEMS sensor.

SUMMARY OF THE INVENTION

The need is therefore still felt to develop a security sensor for anti-intrusion security systems which allows to fully, or at lease partially, overcome the drawbacks and limitations of the security sensors of the prior art. It is therefore a general object of the present description to provide a security sensor which allows to satisfy the aforesaid need.

Such general object is achieved by a security sensor as described and claimed herein. Preferred and advantageous embodiments of the security sensor are also described.

The invention will be better understood from the following detailed description of particular embodiments, provided by way of example and consequently not limiting in any manner, with reference to the accompanying drawings which are briefly described in the following paragraphs.

DETAILED DESCRIPTION

With reference to the attached Figures, a non-limiting embodiment of a security system 1 is shown. In accordance with an embodiment, without introducing any limitations, the security system 1 is an anti-intrusion security system, for example, a perimeter security system which may be associated with a support structure such as, for example, a perimeter fencing net. In particular, by way of explanation and not by way of limitation, in FIG. 1, the anti-intrusion security system 1 is applied to a fence 2 comprising a net 3, for example, a metal net, and a plurality of net support posts 4.

In the example described, the security system 1 comprises at least one array L_A, R_A of security sensors $S_1, \ldots, S_N$ and at least one common control unit C_U. Such common control unit C_U is, in particular, a unit external to the security sensors $S_1, \ldots, S_N$.

Figure 1:
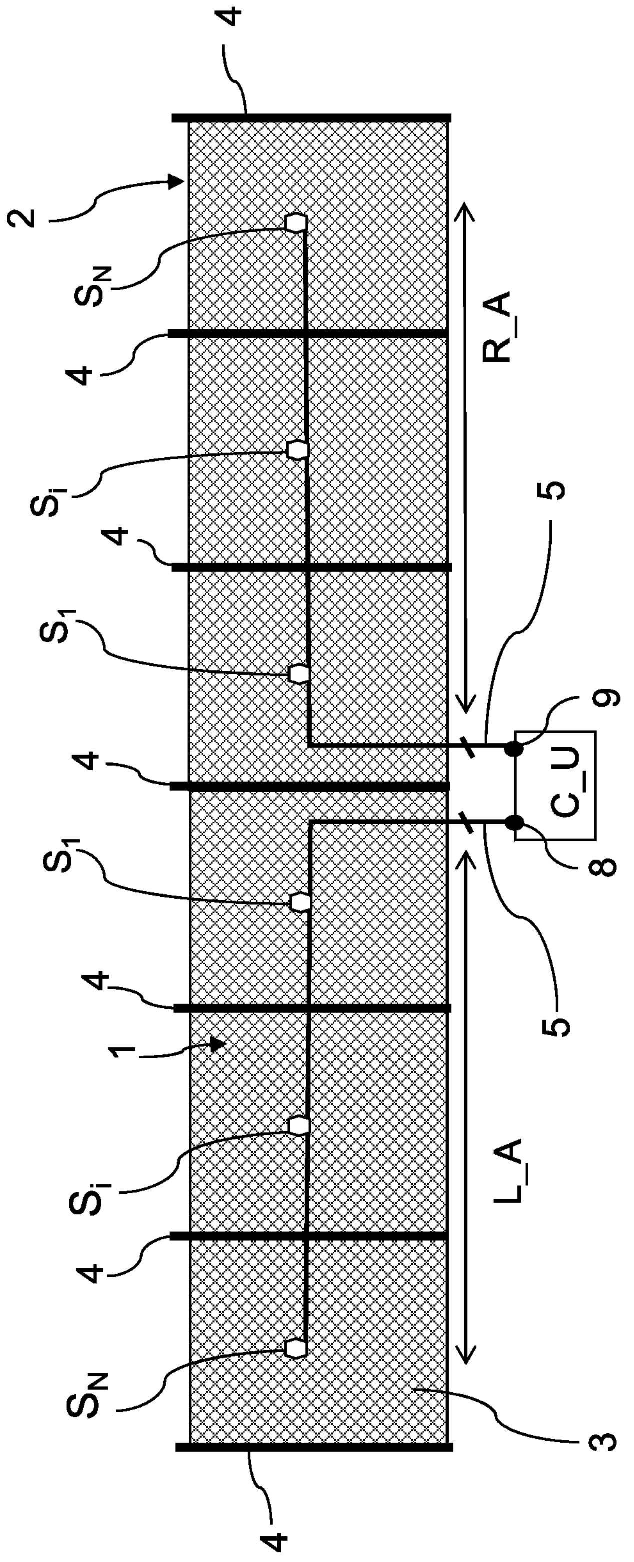
FIG. 1 shows a diagrammatic view of an anti-intrusion security system comprising at least one security sensor, in which the anti-intrusion security system is associated with a support structure such as, for example, a perimeter fencing net.

More in particular, in the example shown in FIG. 1, the anti-intrusion security system 1 comprises, without introducing any limitation, two linear arrays L_A, R_A of security sensors $S_1, \ldots, S_N$, operatively connected to the common unit control C_U. Each array L_A, R_A of the security sensors comprises a plurality of N sensors $S_1$-$S_N$, being N an integer greater than 1. N may be an arbitrarily large number, for example, also approximately equal to 100 or 200.

In the accompanying Figures, the reference symbol $S_i$ indicates a generic security sensor, being "i" an index which may assume positive integer values from 1 to N, extremes included.

Figure 2:
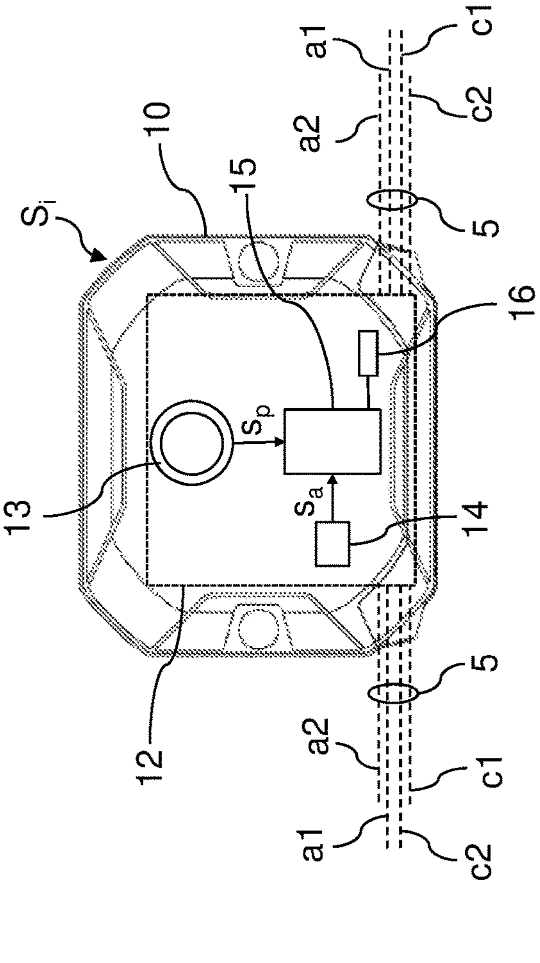
FIG. 2 shows an exemplary functional block diagram of a sensor of the anti-intrusion security system of FIG. 1.

With reference to FIG. 2, each of the security sensor arrays L_A, R_A is preferably a wired array and comprises:

- a shared power supply bus a1, a2 of the plurality of security sensors $S_1$-$S_N$;
- a shared communication bus c1, c2 between the plurality of security sensors $S_1$-$S_N$ to allow an exchange of information between the security sensors $S_1$-$S_N$ and the common control unit C_U.

In a further embodiment, the anti-intrusion security system 1 may comprise wireless security sensors as an alternative to array wired sensors, for example, security sensors equipped with an own power supply and equipped with a wireless communication interface.

In the example described, each array L_A, R_A of security sensors $S_1$-$S_N$ is wired by means of an interconnection cable 5 provided in input to and in output from each sensor $S_1$-$S_N$, adapted to connect the array L_A, R_A of the security sensors $S_1$-$S_N$ to the common control unit C_U. The latter in the example has two interconnection ports 8,9 of which one is provided for the connection of the array L_A and the other is provided for the connection of the array R_A. The aforesaid interconnection cable 5 comprises an adequate number of electrical conductors, so that the same cable may contain the shared power supply bus a1, a2 and the shared communication bus c1, c2. In the particular example shown in FIG. 2, the interconnection cable 5 comprises, without introducing any limitation, four electrical conductors, of which two a1, a2 are provided for the power supply bus. The remaining two conductors c1, c2 are provided to implement the communication bus.

FIG. 2 diagrammatically shows a generic security sensor $S_i$ which will be described below to describe each of the security sensors $S_1$-$S_N$, in general.

The security sensor $S_i$ comprises a container body 10 and a signal acquisition and processing module 12 housed in the container body 10. For example, the container body 10 comprises an internal compartment and the signal acquisition and processing module 12 is housed in the internal compartment of the container body 10. The container body 10 is preferably a sealed body, for example, made of plastic material, such as, for example, ABS or polycarbonate or polyamide.

Figure 3:
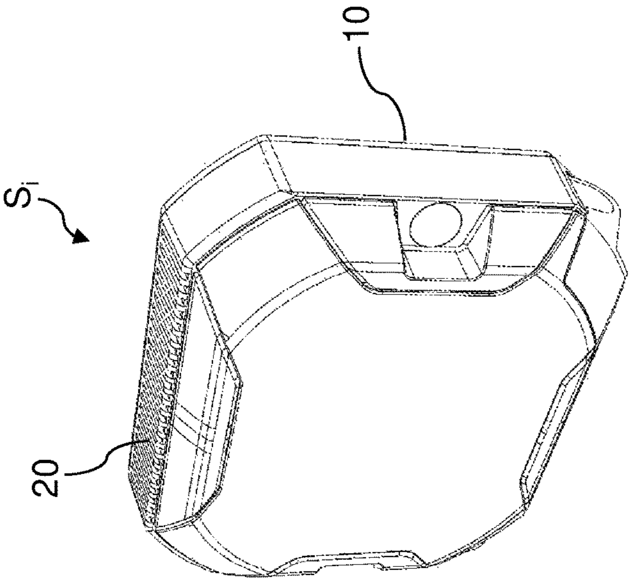
FIG. 3 shows an embodiment of the container body of the security sensor of FIG. 1.

In accordance with a particularly advantageous embodiment, the container body 10 comprises an external wall having at least one finned or indented wall portion 20, as shown in FIG. 3. For example, this wall portion 20 comprises an array of fins and/or grooves, for example arranged in a comb. Said wall portion 20 has the advantage of having a drop-breaking effect, i.e., it allows drops of rainwater to be fragmented into smaller drops, to reduce the effect of the impact of the raindrops on the security sensor 1. Said finned or indented wall portion 20 is preferably an upper wall of the container body 10 when the security sensor 1 is installed on a support structure, such as, for example, a fence 2.

In accordance with a preferred embodiment, the signal acquisition and processing module 12 is integrated in a circuit board, for example, a printed circuit board.

The signal acquisition and processing module 12 of the security sensor $S_i$ comprises a piezoelectric transducer 13 adapted and configured to convert a mechanical stress to which the piezoelectric transducer 13 is subjected into a first electrical signal $s_p$. Such mechanical stress is, for example, produced by a vibration of the net 3, for example, due to an impact, or an attempted climbing or cutting of the net 3. In a second example, the mechanical stress is produced by the bending of a post 4 or fence support element. In a third example, the mechanical stress is produced by an ongoing environmental event, such as, for example, a meteorological event, for example, rain, a hailstorm or the presence of sustained wind.

Preferably, the piezoelectric transducer 13 is, or comprises, a piezoceramic transducer, for example, planar and preferably disc-shaped. The piezoelectric transducer 13 is, for example, mounted on the circuit board of the signal acquisition and processing module 12, for example, welded or glued to the circuit board.

In accordance with an advantageous embodiment, the aforesaid piezoelectric transducer 13 has no inertial mass movable with respect to the piezoelectric transducer 13. Thereby, it is possible to reduce the size of the security sensor $S_i$, and simplify the assembly and the installation thereof.

The signal acquisition and processing module 12 of the security sensor $S_i$, further comprises an accelerometric transducer 14, preferably an MEMS (Micro-Electro-Mechanical Systems) accelerometric transducer, adapted and configured to convert a mechanical acceleration, to which the accelerometric transducer 14 is subjected, in a second electrical signal $s_a$. Such mechanical acceleration is, for example, produced by a deformation or a displacement of the net 3, for example, due to an impact, or an attempted climbing or cutting of the net 3. In a second example, the acceleration is due to the bending of a post 4 or fence support element. In a third example, the acceleration is produced by an ongoing environmental event, such as, for example, a meteorological event, for example, rain, a hailstorm or the presence of sustained wind.

The accelerometric transducer 14 is, for example, mounted on the circuit board of the signal acquisition and processing module 12.

In accordance with an embodiment, the accelerometric transducer 14 is, for example, a triaxial accelerometric transducer, i.e., capable of providing a signal $s_a$ which carries data correlated to accelerations along three axes orthogonal to one another.

The signal acquisition and processing module 12 of the security sensor $S_i$ further comprises a processing unit 15 operatively connected to the piezoelectric transducer 13 and to the accelerometric transducer 14 for receiving the first electrical signal $s_p$ and the second electrical signal $s_a$. The processing unit 15 comprises, for example, a microprocessor or a microcontroller on board which a firmware is installed for acquiring and processing signals. Preferably, the aforesaid firmware may be updated or configured by a remote system.

The first electrical signal $s_p$ and the second electrical signal $s_a$ are provided in input to the processing unit 15, in analog or digital format indifferently, providing, in the first case, that the analog-digital conversion function is performed by the processing unit 15 and, in the second case, that such function is performed by one or more analog-digital converters arranged upstream of the processing unit 15.

In accordance with embodiments, the signal acquisition and processing module 12 may comprise one or more modules for conditioning the electrical signals $s_p$ and $s_a$ provided by the piezoelectric transducer 13 and the accelerometric transducer 14, respectively. Such conditioning modules may perform one or more of the following signal conditioning functions: frequency filtering, amplification, envelope detection. Such conditioning functions may be performed in both the analog and digital domains. Furthermore, at least one part of such signal conditioning functions may be performed directly on board the processing unit 15.

For example, it is advantageous to filter the first electrical signal $s_p$ with a band-pass filter having a lower cut-off frequency equal to or approximately equal to 500 Hz and a higher cut-off frequency equal to or approximately equal to 5,000.00 Hz.

For example, at least in relation to some processings carried out by the processing unit 15, such as the detection of intrusion events and environmental events, it is also advantageous to filter the second electrical signal $s_a$ with a high-pass filter, for example, a DC killer filter, i.e., a filter which at least eliminates the continuous component of such electrical signal $s_a$. Such continuous component may instead be useful for other functions, such as, for example, that of detecting an attempt to remove the security sensor 1 or of detecting a change in the arrangement or position of the security sensor 1 with respect to an initial arrangement or position, for example, due to the fall of vegetation or growth of vegetation. Therefore, it is possible that the processing unit 15 may, at the same time, process both a filtered version as well as an unfiltered version of the second electrical signal $s_a$.

The processing unit 15 is adapted and configured, i.e., programmed, to process the first electrical signal $s_p$ to obtain a first flow of digital samples $D(s_p)$ having digital values correlated with an amplitude measurement of the first electrical signal $s_p$. Said amplitude measurement is, for example, representative of the amplitude, or rather of the amplitude modulus, of the instantaneous voltage, or of the envelope thereof, of the first electrical signal $s_p$ possibly integrated over a period of time.

The processing unit 15 is further adapted and configured, i.e., programmed, to process the second electrical signal $s_a$ to obtain a second flow of digital samples $D(s_a)$ having digital values correlated with an amplitude measurement of the second electrical signal $s_a$. Said amplitude measurement is, for example, representative of the amplitude, or rather of the amplitude modulus, of an acceleration detected by the accelerometric transducer 14.

The processing unit 15 is further adapted and configured, i.e. programmed, to process the first flow of digital samples $D(s_p)$ and the second flow of digital samples $D(s_a)$ to obtain at least one processed flow of digital samples $D_j(s_p, s_a)$ therefrom. The index j is a positive integer which varies from 1 to J, being J an integer greater than or equal to 1 and arbitrarily large. Each digital sample of the processed flow of digital samples $D_j(s_p,s_a)$ has a digital value obtained based on a respective digital sample of the first flow $D(s_p)$ and a respective digital sample of the second flow $D(s_a)$ by means of a calculation function which applies a weighting coefficient $k_a$, $k_p$ to at least one of the respective digital sample of the first flow of digital samples $D(s_p)$ and the respective digital sample of the second flow of digital samples $D(s_a)$. In other words, having said F the aforesaid calculation function, the processed flow of digital samples $D_j(s_p, s_a)$ can be obtained, for example, based on the general formula:

$$D_j(s_p,s_a)=F[k_p*D(s_p),k_a*D(s_a)]$$

in which, in particular the calculation function F, without introducing any limitation, applies two weighting coefficients $k_a$, $k_p$ which may, for example, be linked to each other by the relation:

$$k_a=(1-k_p).$$

The processing unit 15 is also adapted and configured, i.e., programmed, to detect at least one ongoing intrusion event and/or an environmental event based on the analysis of the at least one processed flow of digital samples $D_j(s_p,s_a)$, for example, by comparing the values of the digital samples of such processed flow of digital samples $D_j(s_p,s_a)$, or a moving average of such values, with one or more configured and/or configurable detection thresholds. In practice, when one or more values of the digital samples of the processed flow of digital samples $D_j(s_p,s_a)$ exceed a detection threshold, then the processing unit 15 determines that an intrusion event and/or an environmental event is ongoing. Conveniently, when this happens, the security sensor Si sends an alarm message to the common control unit C_U or, in general, to a remote control center.

In accordance with a surprisingly advantageous embodiment, the aforementioned calculation function is a weighted sum, for example, expressed by the formula:

$$D_j(s_p,s_a)=[(k_p*D(s_p))+(k_a*D(s_a))]$$

the weighting coefficients $k_a$, $k_p$ being, for example, related to each other by the relation:

$$k_a=(1-k_p),$$

$k_p$ being a positive decimal number between 0 and 1, preferably different from 0 and 1.

Based on what has been described above, it is therefore observed that the detection of intrusion events and/or environmental events is carried out by analyzing a digital signal, in particular a processed flow of digital samples $D_j(s_p,s_a)$, obtained from a weighted fusion of the information acquired by the piezoelectric transducer 13 and by the accelerometric transducer 14.

In accordance with an advantageous embodiment, the accelerometric transducer 14 comprises a triaxial accelerometer and the second electrical signal $s_a$ bears data correlated to accelerations along three axes, preferably orthogonal to one another. The values of the second flow of digital samples $D(s_a)$ are obtained by calculating an acceleration module resulting from data correlated with the accelerations along three axes, preferably an RMS value of the accelerations along three axes.

In accordance with a particularly advantageous embodiment, the aforesaid at least one processed flow of digital samples $D_j(s_p,s_a)$ comprises a first processed flow of digital samples $D_1(s_p,s_a)$ and a second processed flow of digital samples $D_2(s_p,s_a)$.

The processing unit 15 is adapted and configured, i.e., programmed, to:

a) process the first flow of digital samples $D(s_p)$ and the second flow of digital samples $D(s_a)$ for obtaining the first processed flow of digital samples $D_1(s_p,s_a)$;

b) process the first flow of digital samples $D(s_p)$ and the second flow of digital samples $D(s_a)$ for obtaining the second processed flow of digital samples $D_2(s_p,s_a)$, which differs from the first processed flow of digital samples $D_1(s_p,s_a)$ for the at least one weighting coefficient applied in the aforesaid calculation function F;

c) detect a first type of intrusion event and/or environmental event according to the analysis of the first processed flow of digital samples $D_1(s_p,s_a)$;

detect a second type of intrusion event and/or environmental event according to the analysis of the second processed flow of digital samples $D_2(s_p,s_a)$.

Thereby, a security sensor $S_i$ allows to accurately detect a series of different types of intrusion events and/or environmental events.

For example, a first processed flow of digital samples $D_1(s_p,s_a)$ may be obtained, which the processing unit 15 may analyze to verify if an intrusion event, which may be classified as "cutting of the fence", is ongoing. In this case, when obtaining the first processed flow of digital samples $D_1(s_p,s_a)$, the processing unit 15 is such as to attribute greater weight to the digital samples of the first flow of digital samples $D(s_p)$, i.e., of the flow of digital samples which bears the information acquired by the piezoelectric transducer 13. In other words, the processed flow $D_1(s_p,s_a)$ will be calculated by setting the weighting coefficient $k_p$ so that it is greater than the weighting coefficient $k_a$. For example, without introducing any limitation, the first processed flow of digital samples $D_1(s_p,s_a)$ may be calculated by setting $k_p=0.7$ and $k_a=0.3$.

For example, a second processed flow of digital samples $D_2(s_p,s_a)$ may be obtained, which the processing unit 15 may analyze to verify if an intrusion event, which may be classified as "climbing on the fence", is ongoing. In this case, when obtaining the second processed flow of digital samples $D_2(s_p,s_a)$, the calculation function F is such as to attribute greater weight to the digital samples of the second flow of digital samples $D(s_a)$, i.e., of the flow of digital samples which bears the information acquired by the accelerometric transducer 14. In other words, the second processed flow of digital samples $D_2(s_p,s_a)$ will be calculated by setting the weighting coefficient $k_p$ so that it is lower than the weighting coefficient $k_a$. For example, without introducing any limitation, the second processed flow of digital samples $D_2(s_p,s_a)$ may be calculated by setting $k_p=0.2$ and $k_a=0.8$.

In accordance with a particularly advantageous embodiment, by using respective weighting coefficients $k_p$, $k_a$, the processing unit 15 may obtain a plurality of processed flows of digital samples, each of which will then be analyzed to allow the security sensor $S_i$ to detect a plurality of different types of intrusion events, such as, for example:

Cutting of a net with an angle grinder;
Cutting of the net with hand shears;
Cutting of a door;
Climbing;
Breakthrough;
Perforation of a wall.

A similar argument also applies to events of the environmental type, in fact, also in this case, the processing unit 15 may be programmed to obtain a plurality of processed flows of digital samples, each of which will then be analyzed to allow the security sensor $S_i$ to detect a plurality of different types of environmental events, such as, for example:

Passage of a train or heavy vehicle;
Road maintenance works;
Wind;
Rain;
Hailstorm;
Earthquake.

It should also be noted that, in the case where the processing unit 15 is such as to obtain two or more processed flows of digital samples, the processings required to obtain such flows may be carried out, in parallel with one another, by the processing unit 15. Furthermore, to detect different types of intrusion events and/or environmental events, the processing unit 15 may analyze the aforesaid flows processed in parallel with one another, allowing the anti-intrusion security system 1 to be particularly fast in detecting environmental and/or intrusion events.

In accordance with an embodiment, each security sensor $S_i$ of the sensor array L_A, R_A further comprises a bidirectional communication interface 16 which operatively connects the security sensor $S_i$ to the common control unit C_U, for example, by means of the shared communication bus c1, c2. The common control unit C_U is adapted and configured to:

determine whether an environmental event is underway;

send a broadcast message to all the sensors $S_i$ of the array L_A, R_A to vary said at least one weighting coefficient and/or event detection parameter, such as, for example, an event detection threshold, used by the processing units 15 of the security sensors $S_i$.

In a particularly advantageous embodiment, the security sensors $S_i$, when the processing unit 15 detects an ongoing environmental event, are such as to send a message to the common control unit C_U to signal the environmental event. The common control unit C_U is adapted and configured to determine that an environmental event is ongoing by counting the number of security sensors $S_i$ which have detected the environmental event and comparing such number with a threshold number. For example, the common control unit C_U determines that an environmental event is ongoing, for example, that rain is ongoing, if the number of security sensors $S_i$ which have detected and signaled the environmental event by means of messages is greater than a threshold number. The threshold number is an arbitrarily large or small positive integer and is a pre-configured or configurable number.

It should be noted that the above description of the security sensor $S_i$ also corresponds to the general description of a method for detecting an intrusion event and/or an environmental event by means of at least one security sensor $S_i$ comprising a piezoelectric transducer 13, an accelerometric transducer 14, preferably an MEMS accelerometric transducer, a processing unit 15 operatively connected to the piezoelectric transducer 13 and to the accelerometric transducer 14, in which the method comprises the steps of:

converting a mechanical stress to which the piezoelectric transducer 13 is subjected into a first electrical signal $s_p$;

converting an acceleration to which the accelerometric transducer 14 is subjected into a second electrical signal $s_a$;

providing the processing unit 15 with the first electrical signal $s_p$ and the second electrical signal $s_a$;

processing the first electrical signal $s_p$ to obtain a first flow of digital samples $D(s_p)$ having digital values correlated with an amplitude measurement of the first electrical signal $s_p$;

processing the second electrical signal $s_a$ to obtain a second flow of digital samples $D(s_a)$ having digital values correlated with an amplitude measurement of the second electrical signal $s_a$;

processing the first flow of digital samples $D(s_p)$ and the second flow of digital samples $D(s_a)$ to obtain at least one processed flow of digital samples $D_j(s_p,s_a)$ therefrom, in which each digital sample of the processed flow of digital samples $D_j(s_p,s_a)$ has a digital value obtained according to a respective digital sample of the first flow of digital samples $D(s_p)$ and a respective digital sample of the second flow of digital samples $D(s_a)$ by means of a calculation function F which applies a weighting coefficient $k_p$, $k_a$ to at least one of the respective digital sample of the first flow of digital samples $D(s_p)$ and the respective digital sample of the second flow of digital samples $D(s_a)$;

detecting an intrusion event and/or an environmental event underway according to the analysis of the processed flow of digital samples $D_j(s_p,s_a)$.

Further features of the aforesaid detection method are immediately evident from the description of the embodiments described above of the security sensor $S_i$ and of the related anti-intrusion security system 1.

From the above, it is apparent that the security sensor $S_i$ of the type described above allows fully achieving the set objects in terms of overcoming the drawbacks of the prior art.

Experimental tests in the field have made it possible to prove that security systems including the security sensors $S_i$ described above have a surprising ability to detect intrusion and/or environmental events and are particularly sensitive in detecting and signaling intrusion events even in the presence of particularly hostile environmental events, while at the same time managing to distinguish and report various types of intrusion events in a particularly effective way.

Furthermore, it is possible to advantageously obtain one or more processed flows of digital samples $D_j(s_p,s_a)$ by suitably configuring one or more weighting coefficients, in which the configuration of the weighting coefficients allows to optimize the performance of the security sensor $S_i$ based on the features of the structure to which it is applied, for example, distinguishing between: poorly stretched net fence, very stretched net fence, masonry wall, fence with bars, gate, etc. The configuration is made so as to more or less weigh the signals provided by the piezoelectric transducer 13 and by the accelerometric transducer 14 based on the mechanical features of the structure to which the security sensors $S_i$ are applied. When configuring the security system, an installer may conveniently carry out a selection, by means of a program capable of interfacing with the security sensors $S_i$, for example by means of the control unit C_U, to set the weighting coefficients by simply selecting the type of structure. In practicing the invention, it is possible to provide a look-up table which, for one or more structures and for one or more environmental events or intrusion events, determines the value of the corresponding weighting coefficients used for calculating the processed flows of digital samples $D_j(s_p,s_a)$. This may also be conveniently carried out by a remote control center operatively connected to the common control unit C_U.

It should be noted that, although embodiments of a security sensor $S_i$ belonging to an array of security sensors operatively connected to a common control unit C_U have been described, also embodiments of the security sensor $S_i$ in which said sensor is a stand-alone sensor form the object of the present invention, in which said security sensor $S_i$ is not operatively connected to an array of sensors and a common control unit C_U, but in which said security sensor is, for example, adapted and configured to locally signal an environmental and/or intrusion event and/or to send a signal of such event to a remote control center.

Without prejudice to the principle of the invention, the embodiments and the manufacturing details may be broadly varied with respect to the above description disclosed by way of a non-limiting example, without departing from the scope of the invention as defined in the appended claims.

What is claimed is:

1. A security sensor comprising a container body and a signal acquisition and processing module housed in the container body, wherein the signal acquisition and processing module comprises:

a piezoelectric transducer configured to convert a mechanical stress to which the piezoelectric transducer is subjected into a first electrical signal;

an accelerometric transducer configured to convert an acceleration to which the accelerometric transducer is subjected into a second electrical signal; and a processing unit operatively connected to the piezoelectric transducer and to the accelerometric transducer for receiving the first electrical signal and the second electrical signal;

wherein the processing unit is configured to:

process the first electrical signal for obtaining a first flow of digital samples having digital values correlated with an amplitude measurement of the first electrical signal;

process the second electrical signal for obtaining a second flow of digital samples having digital values correlated with an amplitude measurement of the second electrical signal;

process the first flow of digital samples and the second flow of digital samples for obtaining at least one processed flow of digital samples therefrom, wherein each digital sample of the at least one processed flow of digital samples has a digital value obtained according to a respective digital sample of the first flow of digital samples and a respective digital sample of the second flow of digital samples by a calculation function F which applies a weighting coefficient to at least one of the respective digital sample of the first flow of digital samples and the respective digital sample of the second flow of digital samples; and detect an intrusion event and/or an environmental event according to an analysis of the at least one processed flow of digital samples.

2. The security sensor of claim 1, wherein the calculation function F is a sum which is weighted by said weighting coefficient.

3. The security sensor of claim 1, wherein said at least one processed flow of digital samples comprises a first processed flow of digital samples and a second processed flow of digital samples and wherein the processing unit is configured to:

a) process the first flow of digital samples and the second flow of digital samples for obtaining the first processed flow of digital samples;

b) process the first flow of digital samples and the second flow of digital samples for obtaining the second processed flow of digital samples, which differs from the first processed flow of digital samples for the weighting coefficient applied in said calculation function F;

c) detect a first type of intrusion event and/or environmental event according to an analysis of the first processed flow of digital samples; and d) detect a second type of intrusion event and/or environmental event according to an analysis of the second processed flow of digital samples.

4. The security sensor of claim 3, wherein step a) and step b) are performed in parallel to each other.

5. The security sensor of claim 1, wherein said environmental event is a weather event.

6. The security sensor of claim 1, wherein the accelerometric transducer comprises a triaxial accelerometer and wherein:

the second electrical signal provides data correlated with accelerations along three axes; and values of the second flow of digital samples are obtained by calculating an acceleration module resulting from data correlated with the accelerations along the three axes.

7. The security sensor of claim 1, wherein the container body comprises an outer wall having at least one portion of finned and/or notched wall.

8. The security sensor of claim 1, wherein the accelerometric transducer is a MEMS accelerometric transducer.

9. The security sensor of claim 6, wherein values of the second flow of digital samples are obtained by calculating a root-means-square (RMS) value of the accelerations along the three axes.

10. An intrusion detection security system comprising:

at least one array comprising a plurality of security sensors, each security sensor of said plurality of security sensors comprising a container body and a signal acquisition and processing module housed in the container body, wherein the signal acquisition and processing module comprises:

a piezoelectric transducer configured to convert a mechanical stress to which the piezoelectric transducer is subjected into a first electrical signal;

an accelerometric transducer configured to convert an acceleration to which the accelerometric transducer is subjected into a second electrical signal; and a processing unit operatively connected to the piezoelectric transducer and to the accelerometric transducer for receiving the first electrical signal and the second electrical signal;

wherein the processing unit is configured to:

process the first electrical signal for obtaining a first flow of digital samples having digital values correlated with an amplitude measurement of the first electrical signal;

process the second electrical signal for obtaining a second flow of digital samples having digital values correlated with an amplitude measurement of the second electrical signal;

process the first flow of digital samples and the second flow of digital samples for obtaining at least one processed flow of digital samples therefrom, wherein each digital sample of the at least one processed flow of digital samples has a digital value obtained according to a respective digital sample of the first flow of digital samples and a respective digital sample of the second flow of digital samples by a calculation function F which applies a weighting coefficient to at least one of the respective digital sample of the first flow of digital samples and the respective digital sample of the second flow of digital samples; and detect an intrusion event and/or an environmental event according to an analysis of the at least one processed flow of digital samples; and a common control unit;

wherein each security sensor of the plurality of security sensors of the at least one array further comprises a two-way communication interface that operatively connects said security sensors with the common control unit, and wherein the common control unit is configured to:

determine whether an environmental event is underway; and send a broadcast message to all the security sensors of the at least one array to vary said weighting coefficient and/or a detection parameter, used by the processing unit to detect an intrusion and/or environmental event underway according to the analysis of the at least one processed flow of digital samples.

11. The intrusion detection security system of claim 10, wherein upon detection of an environmental event underway, the security sensors send a message to the common control unit and wherein the common control unit is configured to determine that an environmental event is underway by counting the number of security sensors that detected the environmental event and comparing said number with a threshold number.

12. A method for detecting an intrusion event and/or an environmental event by at least one security sensor comprising a piezoelectric transducer, an accelerometric transducer and a processing unit operatively connected to the piezoelectric transducer and to the accelerometric transducer, wherein the method comprises:

converting a mechanical stress to which the piezoelectric transducer is subjected into a first electrical signal;

converting an acceleration to which the accelerometric transducer is subjected into a second electrical signal;

providing the processing unit with the first electrical signal and the second electrical signal;

processing the first electrical signal to obtain a first flow of digital samples having digital values correlated with an amplitude measurement of the first electrical signal;

processing the second electrical signal to obtain a second flow of digital samples having digital values correlated with an amplitude measurement of the second electrical signal;

processing the first flow of digital samples and the second flow of digital samples to obtain at least one processed flow of digital samples therefrom, wherein each digital sample of the at least one processed flow of digital samples has a digital value obtained according to a respective digital sample of the first flow of digital samples and a respective digital sample of the second flow of digital samples by a calculation function F which applies a weighting coefficient to at least one of the respective digital sample of the first flow of digital samples and the respective digital sample of the second flow of digital samples; and detecting an intrusion event and/or an environmental event underway according to an analysis of the at least one processed flow of digital samples.

13. The method of claim 12, wherein the accelerometric transducer is a MEMS accelerometric transducer.

* * * * *